Figure 1:
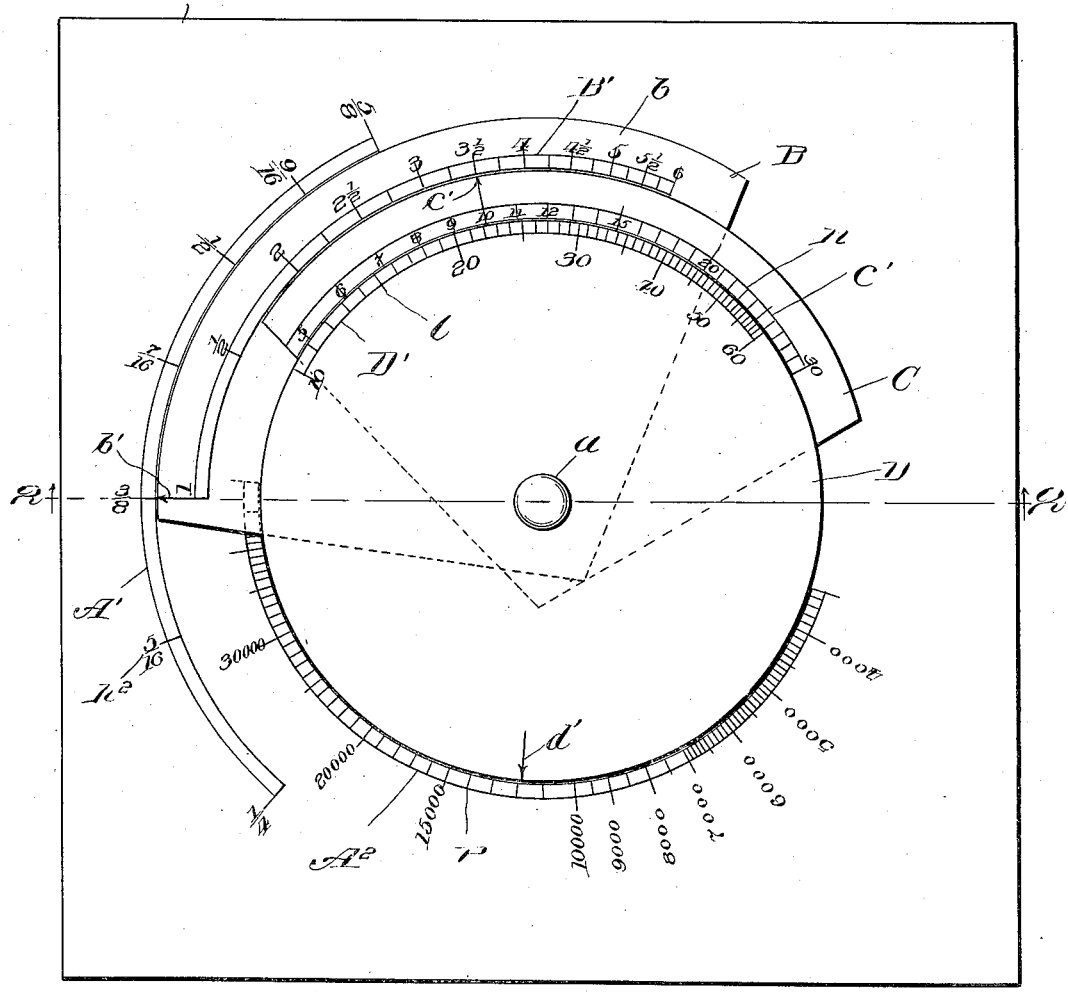

No. 847,904. PATENTED MAR. 19, 1907.
F. K. CASWELL.
SPRING LOAD COMPUTER.
APPLICATION FILED JUNE 13, 1904.

Witnesses:
J. H. S. Gaither
C. C. Cunningham

Inventor
Frederick K. Caswell
by Chamberlin & Wilkinson
Attorneys.

UNITED STATES PATENT OFFICE.

FREDERICK K. CASWELL, OF CHICAGO, ILLINOIS, ASSIGNOR TO RAILWAY STEEL-SPRING COMPANY, A CORPORATION OF NEW JERSEY.

SPRING-LOAD COMPUTER.

No. 847,904.      Specification of Letters Patent.      Patented March 19, 1907.

Application filed June 13, 1904. Serial No. 212,447.

*To all whom it may concern:*

Be it known that I, FREDERICK K. CASWELL, a citizen of the United States, residing at Chicago, county of Cook, State of Illinois, have invented a certain new and useful Improvement in Spring-Load Computers; and I declare the following to be a full, clear, and exact description of the same, such as will enable others skilled in the art to which it pertains to make and use the same, reference being had to the accompanying drawings, which form a part of this specification.

My invention relates in general to mechanical calculators, and more particularly to a device for determining the load which a locomotive or other spring is capable of sustaining.

Locomotive-springs consist in a plurality of superposed steel plates, the number, length, thickness, and width of which determine the load which may be sustained. In constructing springs to sustain given loads it is necessary to determine how many plates must be used of a given length, width, and thickness, or, if plates of given dimensions are to be used, then it is necessary to determine the number of plates required. On the other hand, it is frequently desirable to determine what load a given spring is capable of sustaining.

A formula has been determined by mathematical calculations by means of which the load a spring of given dimensions can safely carry may be determined. The solution of the formula, however, requires time and a greater knowledge of mathematics than is often possessed by the person desiring the information.

The object of my invention is to provide a mechanical calculator for solving the known formula for computing the load a spring can support which requires in its use no knowledge of mathematics and may be quickly adjusted to indicat eeither the load the spring of given dimensions can sustain or the number of plates and their dimensions which must be used in constructing a spring to support a given load.

My invention, generally described, consists in a plurality of relatively movable elements having thereon scales, the graduations on one scale representing the thickness of the plates, the graduations on another scale representing the width of the plates, those on a third scale the number of plates, those on a fourth scale the length of the spring from center to center, and the graduations on a fifth scale, representing in pounds the load the spring can safely carry.

My invention will be more fully described with reference to the accompanying drawing, in which the same is illustrated as embodied in a convenient and practical form, and in which—

Figure 2:
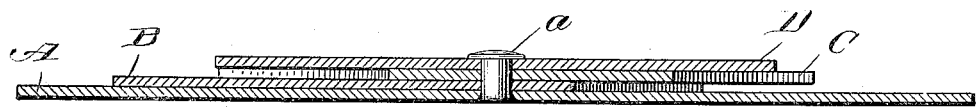

Figure 1 is a plan view; and Fig. 2, a section view on line 2 2, Fig. 1.

The same reference characters are used to designate the same parts in the two figures of the drawing.

The following formula has been derived by mathematical calculations, the solution of which determines the load which a spring composed of a given number of plates of given dimensions is capable of sustaining:

$$P = \frac{2 S f \, n \, b h^2}{3 L}$$

In this formula P stands for the load in pounds; $Sf$, the fiber stress, which is eighty thousand pounds to the square inch in the material usually employed for constructing locomotive-springs; $n$, the number of plates; $h$, the thickness of the plates; $b$, the width of the plates, and L the length of the spring from center to center loaded. By substituting 80,000 for $Sf$ in the formula and expressing the same in a logarithmic equation, we have:

Log. 53333 + Log. $n$ + Log. $b$ +
                Log. $h^2$ − Log. L = Log. P.

My invention consists in providing a device for mechanically solving the logarithmic equation in which I employ a series of relatively movable scales, the graduations of the scales representing the logarithms of the numbers corresponding to the number of plates, the dimensions of the plates, and load in pounds.

Referring to the drawings, reference-letter A designates a base which may be formed of a square piece of cardboard upon which is placed a curved scale A′, the graduations $h^2$ of which represent the logarithms of the numbers corresponding to the thickness of the plates. The numbers "1/4" "5/16"

&c., which designate the graduations are the thicknesses of the plates.

B designates an element mounted upon the base A and movable relatively thereto around a pivot $a$. This element B is preferably in the form of a sector, the outer edge of which corresponds in curvature to the scale A'.

$b'$ represents an arrow on the periphery of the sector B, while B' designates a logarithmic scale the graduations of which, $b$, represent the logarithms of the numbers representing the width of the plates of this spring.

C designates a second element movable about the pivot $a$ and having thereon a scale C', the graduations $n$ of which are the logarithms of the numbers representing the number of plates of the spring, the graduations, however, as in the case of the scales previously described, being designated by the numbers of which the graduations are logarithms. $c'$ is an arrow on the periphery of the element C, which is preferably in the form of a sector, the outer periphery of which corresponds in curvature to the scale B'.

D is a disk rotatably mounted concentrically about the pivot $a$ and having on its periphery a scale D', the graduations $l$ on which are the logarithms of the numbers representing the length of the spring from center to center loaded, the graduations, however, being designated by the numbers themselves.

Concentrically surrounding the periphery of the disk D and located upon the base A is a scale $A^2$, the graduations of which are the logarithms of the load in pounds which the spring is capable of sustaining, the numbers designating the graduations, however, being the capacity of the spring in pounds. $d'$ is a point on the periphery of the disk D, adapted to register with the graduations of the scale $A^2$.

The manner of using my improved computer is as follows: Should, for instance, it be desired to ascertain what load a spring thirty-six inches in length from center to center loaded having sixteen plates three and one-half inches wide and three-eighths of an inch thick is capable of sustaining, the arrow $b'$ on the sector B' is brought into alinement with the graduation "3/8" on the scale A', after which the pointer $c'$ on the sector C is brought into alinement with the graduation "3 1/2" on the scale B'. The disk D is then rotated to bring the graduation "36" of the scale D' thereon into alinement with the graduation "16" on the scale C' of the sector C. The pointer $d'$ will then almost aline with the graduation on the scale $A^2$, which represents twelve thousand pounds, the load the spring is capable of sustaining.

The computer may be equally as well used to ascertain the dimensions of the plates, number of plates, or length of the spring which must be used to sustain a given load, it being obvious that it is only necessary to indicate on the scales the known quantities, and the unknown quantity will then be indicated on its scale.

From the foregoing description it will be observed that I have invented an improved computer by means of which the load a spring of given dimensions is capable of sustaining may be quickly and easily ascertained by merely relatively moving several coöperating elements having scales thereon. It is also evident that my computer is capable of use for the purpose of ascertaining any dimension of the plates which must be used or the number of plates necessary in order that a spring may be constructed capable of sustaining a given load.

While I have described more or less precisely the details in which I have illustrated my invention, yet I do not wish to be understood as limiting myself thereto, as I contemplate changes in the proportion of parts and relative arrangement of the elements as circumstances may require or render expedient.

Having now fully described my invention, what I claim as new, and desire to secure by Letters Patent, is as follows:

1. In a computing device, the combination with a base having a curved scale thereon, of a sector rotatively mounted upon said base having a scale located adjacent to and concentric with the scale on said base, a disk rotatively mounted upon said base concentric with respect to said sector and having a scale thereon, and a pointer on the periphery of said disk coöperating with a scale on said base.

2. In a spring-load-computing device, the combination with a base having a curved scale thereon the graduations of which represent the thickness of the plates composing the spring, of a sector rotatably mounted upon said base having a scale located adjacent to and concentric with the scale on the base the graduations of which represent the width of the plates, a second sector rotatably mounted on the base concentrically with respect to the first sector and having a scale thereon representing the number of plates, and a disk rotatably mounted upon the base concentric with respect to said sectors and having a scale thereon representing the length of the spring, said disk having a pointer on its periphery coöperating with a scale on the base the graduations of which represent the load of the spring.

3. In a computing device, the combination with a base having a curved scale thereon, of a sector rotatively mounted upon said base having its scale located adjacent to and concentric with the scale on said base, a second sector rotatively mounted on said base concentrically with respect to the first sector and having a scale thereon, a disk rotatively mounted upon said base concentric with respect to said sectors having a scale thereon, and a pointer on the periphery of said disk coöperating with a scale on said base.

In testimony whereof I sign this specification in the presence of two witnesses.

FREDERICK K. CASWELL.

Witnesses:
    GEO. L. WILKINSON,
    CLARA C. CUNNINGHAM.